Feb. 10, 1953 W. S. FREDENHAGEN ET AL 2,628,082
APPARATUS FOR CONVERTING HARD ICE CREAM OR FROZEN
CONFECTIONS TO A PRODUCT OF SOFTER CONSISTENCY
Filed Sept. 25, 1951
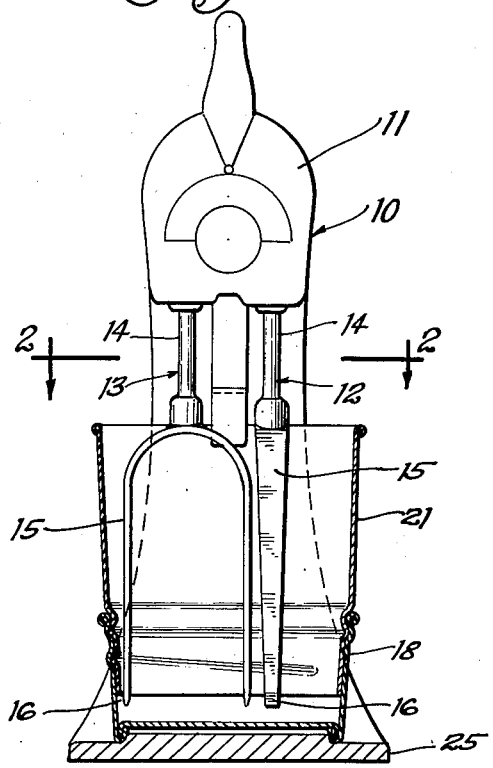
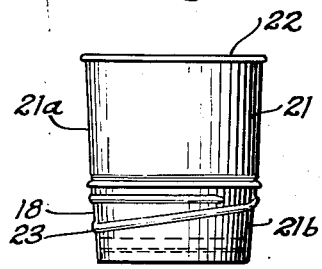 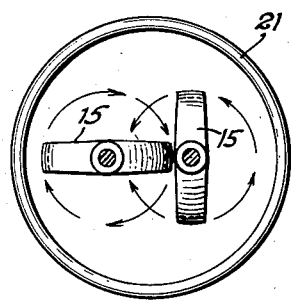 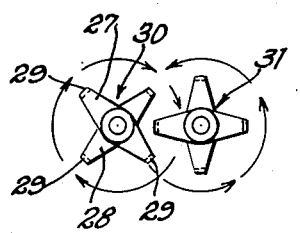
INVENTORS:
Walter S. Fredenhagen
Mark S. Schmidt
BY
Mason, Kolehmainen, Rathburn & Wyss
Attorneys Patented Feb. 10, 1953

2,628,082

UNITED STATES PATENT OFFICE 2,628,082

APPARATUS FOR CONVERTING HARD ICE CREAM OR FROZEN CONFECTIONS TO A PRODUCT OF SOFTER CONSISTENCY

Walter S. Fredenhagen and Mark S. Schmidt, Naperville, Ill.

Application September 25, 1951, Serial No. 248,114

4 Claims. (Cl. 259—104)

The present invention relates to an improved apparatus useful in connection with dispensing so-called soft ice cream or frozen confections of semi-plastic or relatively soft consistency.

It has been common practice heretofore to dispense ice cream by placing one or more scoops of ice cream into a suitable container such as a cone, a dish, paper cup or the like. The ice cream is relatively hard since it is stored in a bulk container at a temperature of 5° to 10° F. and is removed from such container by means of a suitable scoop or dipper. It has been discovered more recently that ice cream or a frozen food confection is much more palatable and satisfactory if it is not of the hardness which ice cream normally attains when stored for sale in the conventional cooling cabinets, and this has become particularly true in connection with many of the lower fat content frozen confections which are generally considered to be ice cream but which due to various state laws and the like are sold under names different from "ice cream," such as "frozen custard" and the like. Numerous tests have indicated that for human consumption frozen confections having a temperature of between 20 and 25° F. are more palatable than when eaten at lower temperatures. It has been the practice quite recently to dispense so-called ice cream or frozen confections of a semi-solid consistency from machines designed initially to make a product of such consistency. Generally in such machines, the ice cream or other frozen product is caused by a driving motor to flow through a discharge tube and into the cone or other receptacle into which it is dispensed. In the case of a cone, the somewhat fluid or soft ice cream flows into the cone and completely fills it and often is of such consistency that the semi-solid or plastic frozen confection may pile up on top of the cone. When of this consistency, the customers seem to appreciate ice cream or frozen confections more than when of hard consistency, and accordingly it is desirable to dispense frozen confections in this manner.

Heretofore, the manufacturing machines required for dispensing such soft or semi-solid frozen confections have been large and cumbersome and relatively expensive. In fact, the ordinary unit sells for around four to five hundred dollars. Moreover, this makes it necessary to make ice cream or the frozen confection in large batches. Actually, the ice cream industry has developed to the point where a relatively few manufacturers mass produce the ice cream and store it at relatively low temperatures for delivery to retail outlets.

In the general type of device heretofore used for producing soft ice cream difficulties have been encountered, especially during periods when the sale of the product is low, in having the mass of ice cream within the unit harden to such an extent that the driving motor actually stalls. Furthermore, the large machines which have heretofore been employed are capable of only dispensing one flavor and if different flavors are desired, a battery of machines must be employed, the expense of which cannot be justified in most small ice cream stores, soda fountains and the like. It would be desirable, therefore, to provide an arrangement whereby only small quantities, such as an individual serving, of ice cream are softened at a time and which has complete flexibility so that any number of flavors may be made with a single unit and any unusual whims of the customer may be satisfied.

It is a well known fact that machines for manufacturing and dispensing ice cream are subject to contamination due to the fact that cream is a medium in which bacteria thrive. It is essential, therefore, that a satisfactory ice cream softening machine or apparatus for dispensing soft ice cream, and preferably for converting hard ice cream to soft ice cream, be of such construction that it is not readily contaminated, that the cleaning and sterilizing of the parts thereof may be accomplished with ease so as to prevent bacteria from accumulating and growing on the apparatus, and so that the requirements set up by the board of health or similar bodies (which set up certain minimum requirements) can be met.

It is another object of the present invention to provide an improved apparatus for dispensing soft ice cream or similar material which is inexpensive, may readily be cleaned and which will pass in all respects the sanitary requirements set up by bodies such as boards of health, and which will give years of satisfactory and foolproof service.

It is another object of the present invention to provide a small and inexpensive ice cream softener which may be used in soda fountains, small stores and the like and with which only an individual serving of hard ice cream is softened at a time so that it may be reduced to the semi-fluid state.

Still another object of the present invention resides in the provision of an improved composite mixing container for use in the present invention.

It is a further object of the present invention to provide an improved apparatus for dispensing semi-solid frozen edible compositions, such as ice cream, in which hard ice cream is softened and the same container is used within which to perform the softening operation that is used in which the product is dispensed.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing, in which:

Fig. 1 is an elevational view partly in section of an improved apparatus embodying the present invention for use in carrying out the improved method of the present invention;

Fig. 2 is a sectional view taken on line 2—2 of Fig. 1, assuming that Fig. 1 shows the complete apparatus;

Fig. 3 is an elevational view of a portion of the apparatus shown in Fig. 1; and Fig. 4 is a view somewhat similar to Fig. 2 illustrating a modified mixer construction which may be employed in connection with the present invention.

Briefly, the apparatus forming a part of the present invention and used in carrying out the process of the present invention includes a mixer, in some respects similar to a conventional household mixer, for converting a single helping or serving of hard ice cream to a more palatable consistency and wherein the ice cream is served in the container in which it is originally placed for conversion to its more palatable state. The apparatus includes an improved mixing cup in some respects similar to that disclosed and claimed in Fredenhagen et al. Patent No. 2,136,355. Regardless of the desires of customers, any flavor may be produced with a single apparatus since the appropriately flavored ice cream or other frozen food product may initially be placed within the mixing container or a standard flavor of ice cream may be employed and a suitable flavoring material added thereto as the case may be.

As has been pointed out above, the modern practice of dispensing ice cream or frozen food products has involved the manufacture of the initial product by a manufacturing organization which supplies its product to a large number of retail outlets, such as stores, soda fountains and the like, since as in many industries today more uniform and better results are obtained when a product is manufactured on a large scale or mass production basis. This contrasts with the early method of dispensing ice cream where every outlet manufactured its own product. Now a relatively smaller number of manufacturers supply a large number of outlets. The present invention contemplates utilizing the benefits of the system where a relatively small number of manufacturers supply a large number of outlets and as far as the present invention is concerned, it is assumed that the food products, such as ice cream or one of the low fat content products, such as frozen custard, are manufactured at a central point and stored for eventual delivery to the various retail outlets. When the ice cream is supplied to the retail outlets and particularly when it is to be dispensed at the retail outlets, it is placed in a dispensing cabinet which tends to maintain the ice cream at a low temperature of the order of 5° to 10° F. However, as was pointed out above, it is desirable that means be provided to convert this low temperature product to a product having a temperature substantially warmer and preferably of the order of 20° to 25° F., which is some 15° to 20° warmer than that of ice cream served according to prior standard practice.

In accordance with the present invention, there is provided an ice cream softener or mixer generally designated in Fig. 1 by the reference numeral 10, which mixer comprises an ordinary motor unit designated at 11 which may have a configuration somewhat similar to the ordinary household mixers or somewhat similar to the mixers employed in making malted milks, milk shakes and the like. The particular construction of the unit which performs the mixing action aside from the actual mixing elements is immaterial as far as the present invention is concerned, and the specific illustration is by way of example only. As illustrated, the mixer 10 is provided with a pair of beater elements 12 and 13 quite similar to those employed in some of the conventional household mixers. These beater elements each comprise relatively heavy shanks 14, to the lower end of which is attached a beating element comprising a somewhat U-shaped tine 15 disposed in inverted position with the tine ends directed downwardly and pointed as designated at 16 for a purpose which will become apparent from the following description. The beater axes of beaters 12 and 13 are disposed in spaced parallel relationship and spaced so that the beater elements 15 intermesh to the maximum extent as clearly indicated in Fig. 2 of the drawing, thereby to insure thorough mixing action over the area covered by the beater elements and, in other words, over the area defined by the maximum extent of mixing of each beater element. Preferably the beaters 12 and 13, and particularly the beater elements 15 thereof, are formed of stainless steel.

Further, in accordance with the present invention, the apparatus for softening frozen confections or ice cream includes a mixing container comprising preferably the conventional paper cup designated by the reference numeral 18. In view of the fact that the ice cream or other frozen product to be softened is of very hard consistency when initially placed in the paper container 18, means must be provided to provide an effective mixing container which can withstand the torque applied thereto when the material to be mixed is of fairly solid consistency. Accordingly, there is provided a sleeve member generally designated at 21 which is in some respects similar to that disclosed in the above mentioned Fredenhagen et al. patent. However, in view of the fact that the torque applied to the walls of the composite container defined by the paper cup and sleeve 21 is relatively great, the sleeve 21 incorporates a feature of the present invention best shown in Fig. 3 of the drawing. As illustrated, the sleeve comprises a main body portion designated by the reference numeral 21a, preferably formed of stainless steel or other suitable material having a conventional rolled rim 22 at the upper end thereof and a portion 21b of substantial length and of reduced cross section at the lower end. Moreover, this portion 21b of reduced cross section is provided with rolled threads 23 of substantial depth so as to be threaded for a substantial distance into the open end of the paper cup 18, the threads in the sleeve 21 actually deforming the cup 18 so as to provide a very rigid connection. The threads are in effect a raised spiral of substantial pitch on the outside of said sleeve. However, this connection must be one which may very readily be made initially or be broken when it is desired to separate the sleeve 21 from the cup 18. All that the operator need do in initially associating the sleeve 21 with the cup 18 is to insert the portion of the reduced cross section 21b into the open end of the cup 18 and apply a slight twisting motion effectively threading the two together. It has been found further that with this arrangement it is almost impossible to pull the cup 18 and sleeve 21 apart by a direct pulling force, and yet by a simple twisting motion the two may be separated by anyone without the requirement of a powerful wrist or the like. The threaded configuration of the portion 21b of the sleeve 21 is, therefore, an important aspect of the present invention since the prior art arrangement disclosed in the above-mentioned patent is found to be unsatisfactory for carrying out the process of the present invention.

The length of the portion 21a of the sleeve 21 may be varied to some extent. It must be inserted sufficiently to provide the desired rigid connection between the two parts of the composite container and yet the shorter it is, the smaller the portion thereof actually contacted by the material being softened. The metal sleeve 21 proves to be a very sanitary device since, in the first place, it renders itself to easy cleaning and sterilization and secondly, if the portion 21b is kept to a minimum length consistent with the desired rigidity, very little contact of the material to be mixed with the inside of the sleeve 21 occurs so that there is substantially no introduction of the material being softened into the washwater when washing or sterilizing the sleeve 21.

From the description included above, it will be appreciated that in converting hard ice cream to a semi-plastic consistency with the present invention, the sleeve 21 and cup 18 are first associated with each other and an appropriate amount of hard ice cream is inserted into the container effectively defined by the sleeve and cup. The container is then moved upwardly along the axes of the beater elements 12 and 13 in a manner so that the beater elements are received within the container, and it will be apparent that the pointed ends 16 of the beater elements 15 are an important feature in permitting ready insertion of the beater elements into the hard ice cream.

It will be understood that the beater or mixer 10 will be provided with suitable switch means which may be actuated by the composite container to initiate operation of the motor when the cup is moved to the position shown in Fig. 1 of the drawing. Also, the beater may be provided with a suitable base such as is designated at 25 in the drawing to secure the cup during the mixing operation. As was mentioned above, however, this construction of the beater or mixer forms no part of the present invention, and actually the beater may even comprise one of the types of mixers in which a large number of units are driven from a common prime mover now so extensively used. It should be understood, however, that the beater construction is such as to actuate the material within the composite container from wall to wall and substantially to the bottom thereof. This means that the beater elements should have the tines closely approach the walls of the composite container with the pointed portions 16 of the beater elements extending almost to the bottom of the composite container.

It will be apparent that with the present construction numerous advantages are attained over that of prior art devices primarily with respect to producing only a single serving at a time and, moreover, producing this serving in a composite container from which it is not removed but in which it is served to the purchaser merely by removing the sleeve 21. It will be understood that for any appropriate flavor which may be desired, suitable flavoring material may be inserted in the composite container with the hard ice cream to be softened. Thus there is provided a completely flexible device which will be little more expensive than conventional malted milk mixers now extensively employed in soda fountains, ice cream stores and the like and yet which will permit one to convert a hard ice cream to a soft ice cream in a minimum of time and of any desired flavor.

In Fig. 4 of the drawing there is illustrated somewhat schematically a modification of the beater construction in which each beater element, instead of being of inverted U-shaped configuration each having two prongs, comprises an inverted double U-shaped configuration including U-shaped elements 27 and 28 thereby defining four equally spaced prongs 29. The individual beaters are generally designated by the reference numerals 30 and 31 in Fig. 4 of the drawing. Due to the larger number of prongs engaging the edible frozen composition, a more thorough mixing operation for the same motor speed is attained. However, the beater elements of Fig. 1 have been found satisfactory, are less expensive to manufacture and are, if anything, less difficult to clean. It will be understood further that the beater elements are readily removable for cleaning purposes but to some extent are self-cleaning in that rotation thereof for a brief interval after removal of the material being softened thereby will cause any adhering mixture to be thrown off by centrifugal force. Consequently, fairly high speed rotation of the beater elements is preferred, although if the self-cleaning feature is not essential, slower speed operation may also be used.

In view of the detailed description included above, the operation of the present invention will be readily understood by those skilled in the art, and it will be appreciated that there has been provided an improved method of dispensing ice cream by converting a solid, less palatable mass to a semi-solid much more palatable food with numerous advantages over prior art devices as fully set forth above.

Where the expression "ice cream" is used throughout the specification and claims, it is intended to include similar products, such as the low fat content frozen products, which are generally not referred to as ice cream even though to the general public they are ice cream.

While there have been illustrated several embodiments of the present invention, it will be apparent that changes and modifications both as to apparatus and method will readily occur to those skilled in the art, and it is intended in the appended claims to cover all such changes and modifications as fall within the true spirit and scope of the present invention.

What is claimed as new and desired to be secured by Letters Patent of the United States is:

1. Apparatus for converting relatively hard ice cream to a more palatable consistency generally referred to as soft ice cream having a temperature of the order of 20° F. comprising only a pair of intermeshed rotatable motor driven beater elements each comprising a pair of downwardly extending pointed prongs, and a container for receiving said beater elements therein and for containing said ice cream while subjected to a beating action by said elements, said container comprising a paper cup and a sleeve including a threaded portion for making threaded engagement with the open end of said cup, said pointed prongs permitting ready insertion of said elements into the hard ice cream.

2. Apparatus for converting relatively hard ice cream to a more palatable consistency generally referred to as soft ice cream having a temperature of the order of 20° F. comprising a pair of intermeshed rotatable motor driven beater elements each comprising an inverted U-shaped beater element including a pair of downwardly extending pointed prongs, and a container for receiving said beater elements therein and for containing said ice cream while subjected to a beating action by said elements, said container comprising a paper cup and a metal sleeve including a threaded portion on said sleeve for making threaded engagement with the open end of said cup, said pointed prongs permitting ready insertion of said elements into the hard ice cream as said container is moved toward said elements along the longitudinal axes of said beater elements.

3. A composite mixing container for use with apparatus for converting hard ice cream to soft ice cream comprising a paper cup, a cylindrical sleeve including a portion of larger diameter than the maximum diameter of said cup and a portion of smaller diameter insertable into the open end of said cup, a shoulder defined between said two portions of said cup to limit the extent of insertion of said sleeve into said cup, and means defining a raised spiral thread on said portion of reduced cross section for effectively uniting said sleeve and said cup as a unitary container against separation thereof other than by a relative twisting motion between said cup and sleeve.

4. Apparatus for converting relatively hard ice cream to a more palatable consistency generally referred to as soft ice cream having a temperature of the order of 20° F. comprising a pair of intermeshed rotatable motor driven beater elements each comprising an inverted U-shaped beater element including a pair of downwardly extending pointed prongs, and a container for receiving said beater elements therein and for containing said ice cream while subjected to a beating action by said elements, said container comprising a paper cup of a predetermined height and a metal sleeve including a recessed portion having threads thereon for making threaded engagement with the open end of said cup, said recessed portion extending downwardly into the paper cup a distance greater than half of said predetermined height, said pointed prongs permitting ready insertion of said elements into the hard ice cream as said container is moved toward said elements along the longitudinal axes of said beater elements.

WALTER S. FREDENHAGEN.
MARK S. SCHMIDT.

REFERENCES CITED

The following references are of record in the file of this patent:

UNITED STATES PATENTS

| Number | Name | Date |
| --- | --- | --- |
| 132,483 | Muth | Oct. 22, 1872 |
| 203,047 | Howe | Apr. 30, 1878 |
| 1,014,382 | Forth | Jan. 9, 1912 |
| 2,136,355 | Fredenhagen et al. | Nov. 8, 1938 |
| 2,525,338 | Brown et al. | Oct. 10, 1950 |